United States Patent
Tashiro et al.

(10) Patent No.: US 8,666,955 B2
(45) Date of Patent: Mar. 4, 2014

(54) DATA MANAGEMENT METHOD AND DATA MANAGEMENT SYSTEM

(75) Inventors: Naomitsu Tashiro, Oi (JP); Taizo Hori, Hadano (JP); Motoaki Iwasaki, Hiratsuka (JP)

(73) Assignees: Hitachi, Ltd., Tokyo (JP); Hitachi Information & Telecommunication Engineering, Ltd., Yokohama-shi (JP)

( * ) Notice: Subject to any disclaimer, the term of this patent is extended or adjusted under 35 U.S.C. 154(b) by 152 days.

(21) Appl. No.: 13/132,056

(22) PCT Filed: Apr. 11, 2011

(86) PCT No.: PCT/JP2011/002123
§ 371 (c)(1),
(2), (4) Date: May 31, 2011

(87) PCT Pub. No.: WO2012/140686
PCT Pub. Date: Oct. 18, 2012

(65) Prior Publication Data
US 2012/0259825 A1     Oct. 11, 2012

(51) Int. Cl.
*G06F 7/00*     (2006.01)
(52) U.S. Cl.
USPC .......................................................... 707/698
(58) Field of Classification Search
USPC .................................. 707/692, 747, 768, 698
See application file for complete search history.

(56) References Cited

U.S. PATENT DOCUMENTS

| | | | |
|---|---|---|---|
| 5,990,810 A | 11/1999 | Williams | |
| 7,797,323 B1 * | 9/2010 | Eshghi et al. | 707/737 |
| 2005/0283500 A1 * | 12/2005 | Eshghi et al. | 707/200 |
| 2008/0133446 A1 | 6/2008 | Dubnicki et al. | |

FOREIGN PATENT DOCUMENTS

| | | |
|---|---|---|
| GB | 2 450 025 A | 12/2008 |
| WO | WO 2008/067226 A1 | 6/2008 |

OTHER PUBLICATIONS

PCT International Search Report and Written Opinion on application No. PCT/JP2011/002123 dated Nov. 28, 2011; 10 pages.

* cited by examiner

*Primary Examiner* — Rehana Perveen
*Assistant Examiner* — Hung Havan
(74) *Attorney, Agent, or Firm* — Foley & Lardner LLP

(57) ABSTRACT

A data management system respectively computes first hash values while sliding a window a prescribed amount at a time with respect to a prescribed range from a start location of a data block to a prescribed size. The system extracts, from among the first hash values, a first hash value, which is equivalent to a characteristic value, and partitions the data block into a first chunk of data at a location corresponding to this first hash value. The system determines coincidence between a first chunk of data and a stored second chunk of data, and prevents duplicate data from being stored twice.

9 Claims, 11 Drawing Sheets

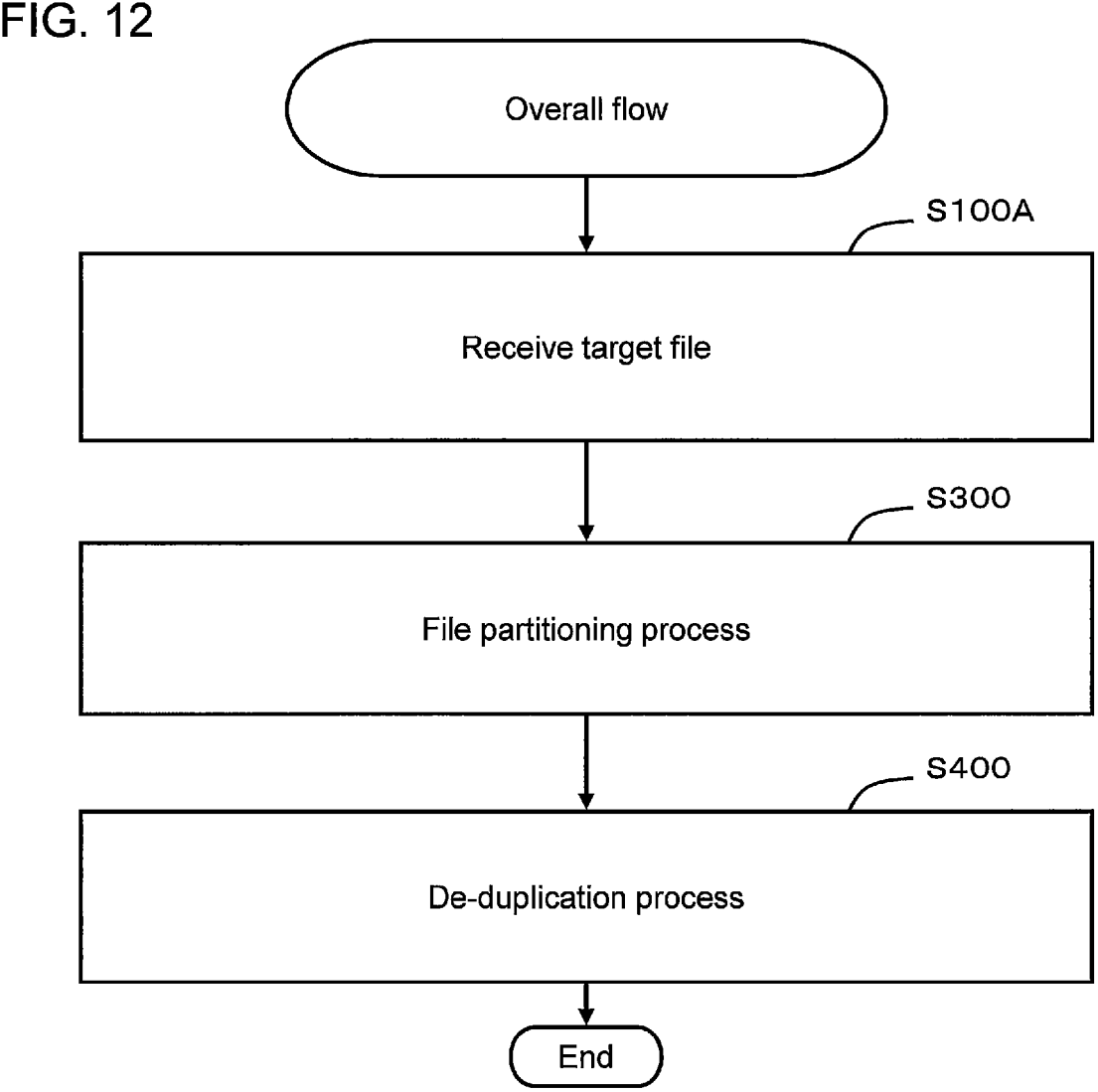

DATA MANAGEMENT METHOD AND DATA MANAGEMENT SYSTEM

TECHNICAL FIELD

The present invention relates to a data management method and a data management system.

BACKGROUND ART

Large numbers of the files being managed by companies and so forth are either complete or partial matches to other files. For example, when a file has been backed up numerous times, large numbers of the same file are created. In addition, in a case where a portion of an existing file is updated to create a new file, many parts of the new file will be identical to the existing file. The generation of large numbers of duplicate files like this wastefully consumes a storage resource.

Accordingly, technology for detecting and eliminating duplicate files has been proposed. The prior art detects duplicate data by partitioning a file into variable lengths and computing a hash value for each partitioned piece of data (Patent Literature 1).

In this prior art, a hash value is computed for each prescribed size from the start of a file, and a determination is made as to whether or not this hash value matches with a predetermined constant value. When the hash value matches the constant value, the file is partitioned at this part.

CITATION LIST

Patent Literature

PTL 1: U.S. Pat. No. 5,990,810

SUMMARY OF INVENTION

Technical Problem

In the prior art, data duplication is eliminated by partitioning a file into variable lengths. Partitioning a file into variable lengths is generally more efficient for eliminating data duplication than partitioning the file into a fixed length.

However, in the prior art, there is no guarantee that the hash value and the constant value will match up at the proper size. In a case where the hash value does not readily match up with the fixed value, the size of the file partition becomes larger. The larger the partition size, the lower the likelihood of a match with the stored data, thereby reducing the efficiency of de-duplication.

With the foregoing in mind, an object of the present invention is to provide a data management method and a data management system that make it possible to partition and manage data in a relatively appropriate size. Another object of the present invention is to provide a data management method and a data management system that are able to manage data by partitioning the data into a size that approximates a prescribed size and efficiently eliminating duplicate data.

Solution to Problem

A data management method according to the present invention is a data management method for partitioning and managing data blocks in variable lengths, including the steps of: (a1) computing a first hash value for each piece of data within a computation area for computing a hash value based on data within the computation area and a prescribed first hash function while sliding the computation area a prescribed amount at a time with respect to a prescribed range from a prescribed start location of the data block to a prescribed size; (a2) extracting, from among the hash values obtained within the prescribed range, a first hash value that is equivalent to a characteristic value, which is determined relatively based on a prescribed criterion; (a3) acquiring a first chunk of data by partitioning the data block at a location corresponding to the first hash value that is equivalent to the characteristic value; and (a4) repeatedly executing the a1, a2, and a3 with respect to the partitioned data block, for partitioning and managing the entire original data block as the multiple first chunks of data.

The characteristic value may be either a minimum value or a maximum value among the first hash values obtained within the prescribed range.

In a case where the first hash value obtained based on data within the computation area matches a value preconfigured as a theoretical limiting value of the characteristic value, the first chunk of data may be created by partitioning the data block at a location corresponding to the first hash value that matches the theoretical limiting value.

The prescribed start location may be configured as a value obtained by adding a prescribed lower limit to a start location of the data block.

In a case where a size of the entire data block does not satisfy a prescribed upper limit, the entire data block may be regarded as the first chunk of data.

The present invention may also be understood as a program for managing data. This computer program can be distributed via either a communication media or a recording medium.

BRIEF DESCRIPTION OF DRAWINGS

FIG. 12 is a flowchart showing the overall flow of processing.

DESCRIPTION OF EMBODIMENTS

The embodiment of the present invention will be explained below based on the drawings. In this embodiment, as described below, there is detected, from among multiple hash values for detecting a file data partition location as an example of a data block, a first hash value equivalent to a characteristic value at least one or more of which always exist thereamong. Either of a minimum value or a maximum value can be used as the characteristic value. One or more first hash values having the smallest value (minimum value) and one or more second hash values having the largest value (maximum value) are included in a group of multiple first hash values. In a case where either multiples of either the minimum value or the maximum value exist, for example, whichever one is detected first can be used.

Figure 1:
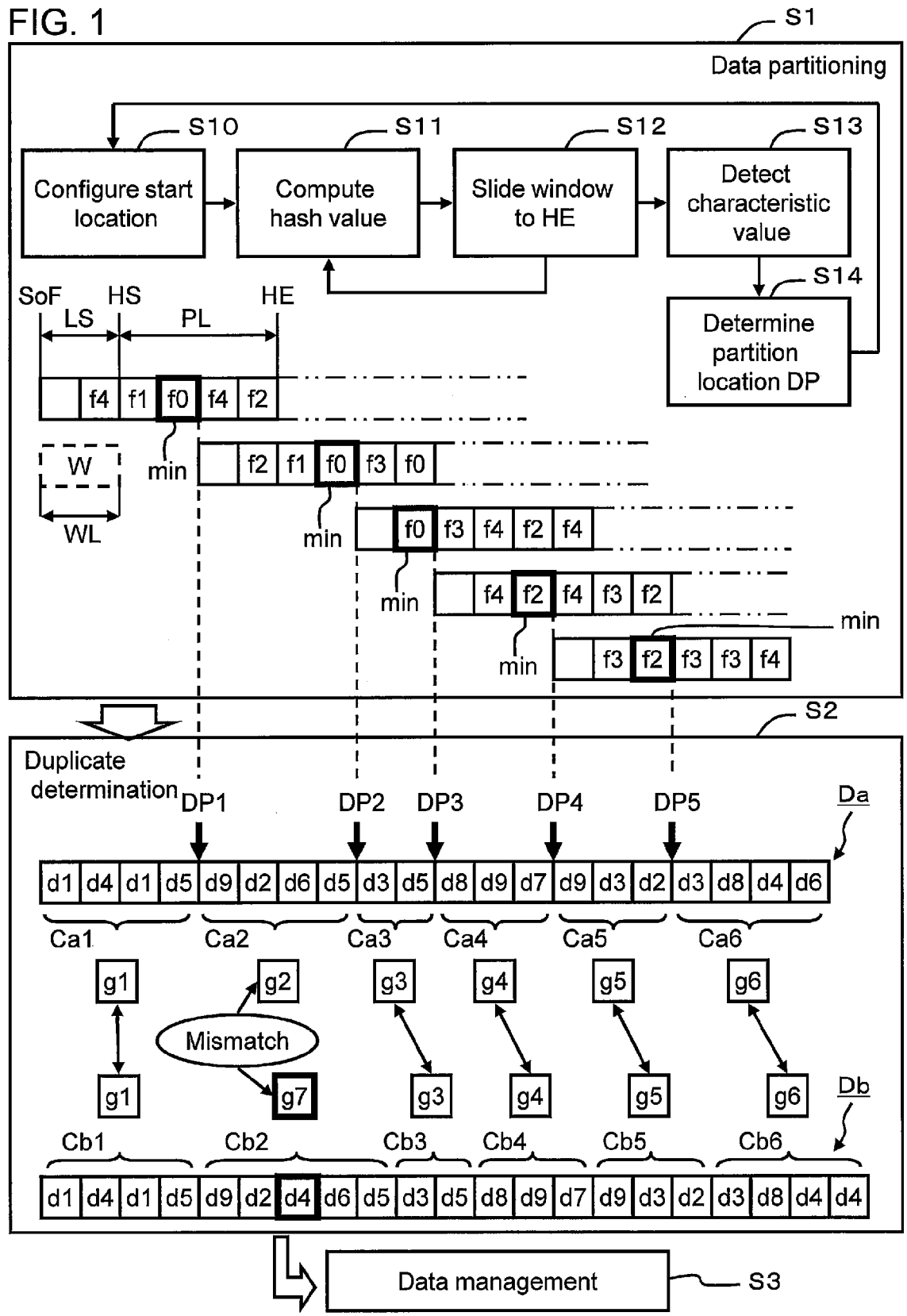
FIG. 1 is a schematic diagram showing an overview of the entire embodiment of the application.

FIG. 1 shows an overview of the entire embodiment of this specification. A data partitioning process S1, a duplicate detection process S2 and a data management process S3 are shown in FIG. 1. The data partitioning process S1 is for partitioning file data. The duplicate detection process S2 is for detecting duplicate data in the partitioned file data. The data management process S3 is for partitioning and managing the file data.

The data partitioning process S1 will be explained. The data partitioning process S1, for example, comprises a start location determination process S10, a first hash value computation process S11, a window sliding process S12, a characteristic value detection process S13, and a partition location determination process S14.

The start location determination process S10 determines a location HS from which to start a process for computing a first hash value. The window W depicted using the dashed line corresponds to a "computation area" for computing the first hash value. The window size WL, for example, may be configured at around 48 bytes.

S10 determines as the start location HS a location that is posterior to the start of the file data (SoF) by a lower limit LS. The lower limit LS, for example, may be configured to around four kilobytes.

The first hash value computation process S11 inputs data included within the window (for example, 48 bytes of data) to a first hash function f(x) and computes a first hash value.

The window sliding process S12 slides the window toward the posterior side of the file data by a prescribed amount subsequent to the first hash value having been computed. The window sliding process S12 slides the window a prescribed amount at a time along a prescribed range up to an end location HE, which is separated from the start location HS by a prescribed size PL. The window, for example, slides one byte at a time. The prescribed size PL, for example, may be configured at around eight kilobytes.

Each time the window is Slid, the first hash value computation process S11 computes a first hash value with respect to the data within the window. Therefore, multiple first hash values are computed and stored for a prescribed range of data from the start location HS to the end location HE.

The characteristic value detection process S13 detects, from among the multiple first hash values that have been stored, a first hash value equivalent to a characteristic value, which is determined relatively based on a prescribed criterion.

The prescribed criterion, for example, is either the selection of the smallest value or the selection of the largest value from among the multiple first hash values. A value that is determined relatively is a value, which is comparatively selected from among multiple first hash values rather than being a preconfigured fixed value.

For example, if the minimum value were to be given as an example of the characteristic value, in a group of first hash values with the values "1, 2, 3, 4", "1" would be the minimum value. In addition, in another group of first hash values with the values "7, 8, 9, 7", "7" would be the minimum value. At least one or more characteristic values always exist like this among multiple first hash values. The same holds true in a case where the characteristic value is the maximum value.

The partition location determination process S14 regards the location corresponding to the first hash value equivalent to the characteristic value as the partition location DP. The file data becomes a first chunk of data by being partitioned at the partition location DP.

The window is configured once again at the start location of the remaining file data subsequent to partitioning. Then, a first hash value is computed with respect to the data within the window as the window is once again Slid a prescribed amount at a time up to the end location HE. A location equivalent of the characteristic value is configured from among the respective first hash values as the partition location DP.

The file data is partitioned into multiple first chunks of data by repeating the above-described processing.

Furthermore, a window size WL of 48 bytes, a lower limit of four kilobytes, and a prescribed size PL of eight kilobytes were described, but these numeric values are examples. Other numeric values can also be used. In addition, a window size of two bytes and a prescribed size of four bytes are shown in FIG. 1 for convenience of explanation. The window is Slid one byte at a time. The values f0, f1, f2, f3, and so forth in FIG. 1 denote first hash values obtained using the first hash function f(x).

In the data partitioning process S1, a first chunk of data that is less than the lower limit LS will not be created. The size of the first chunk of data is a value of a range from the lower limit LS to a value that adds the prescribed size PL to the lower limit LS (LS<=chunk size<=LS+PL). Therefore, in this embodiment, it is possible to prevent file data from being partitioned at a size that is smaller than the lower limit LS, and from being partitioned at a size that is larger than (LS+PL). That is, the size of the first chunk of data can be kept within a fixed range. As a result of this, data that is duplicated within the file data can be detected efficiently, and can be managed efficiently with limited storage resources.

The duplicate detection process S2 will be explained. In the duplicate detection process S2, a second hash value is computed for each first chunk of data. That is, a second hash value is obtained by inputting the first chunk of data into a second hash function g(x).

The duplicate detection process S2 determines whether or not the second hash value of each first chunk of data matches the second hash value of each second chunk of data stored in a storage part.

In FIG. 1, a sign Ca is the first chunk of data, and a sign Cb is attached to the second chunk of data. Signs d1, d2, d3, d4 and so forth denote one byte each of data. In the example shown in the drawing, for example, the second hash value g3 has been computed from the data d3 and d5 of the third first chunk of data Ca3.

Duplicate chunks of data are determined by comparing the second hash value of each first chunk of data Ca of a target file data Da with the second hash value with respect to the second chunk of data Cb already stored in the system.

For example, the first chunks of data Ca1, Ca3, Ca4, Ca5, Ca6 are the same as the second chunks of data Cb1, Cb3, Cb4, Cb5, Cb6. This is because the second hash values match up with one another.

By contrast, the second hash value (g2) of the second first chunk of data Ca2 and the second hash value (g7) of the second chunk of data Cb2 do not match. Therefore, the first chunk of data Ca2 and the second chunk of data Cb2 are different.

The reason the second hash values differ is because the data enclosed by the thick line (d4) in the second chunk of data Cb2 of the pre-update old file data Db is not included in the first chunk of data Ca2 of the target file data Da.

In this embodiment, an added, altered, or deleted portion (chunk) of data can be detected like this. The data management process S3 will be explained in detail further below.

FIRST EXAMPLE

Figure 2:
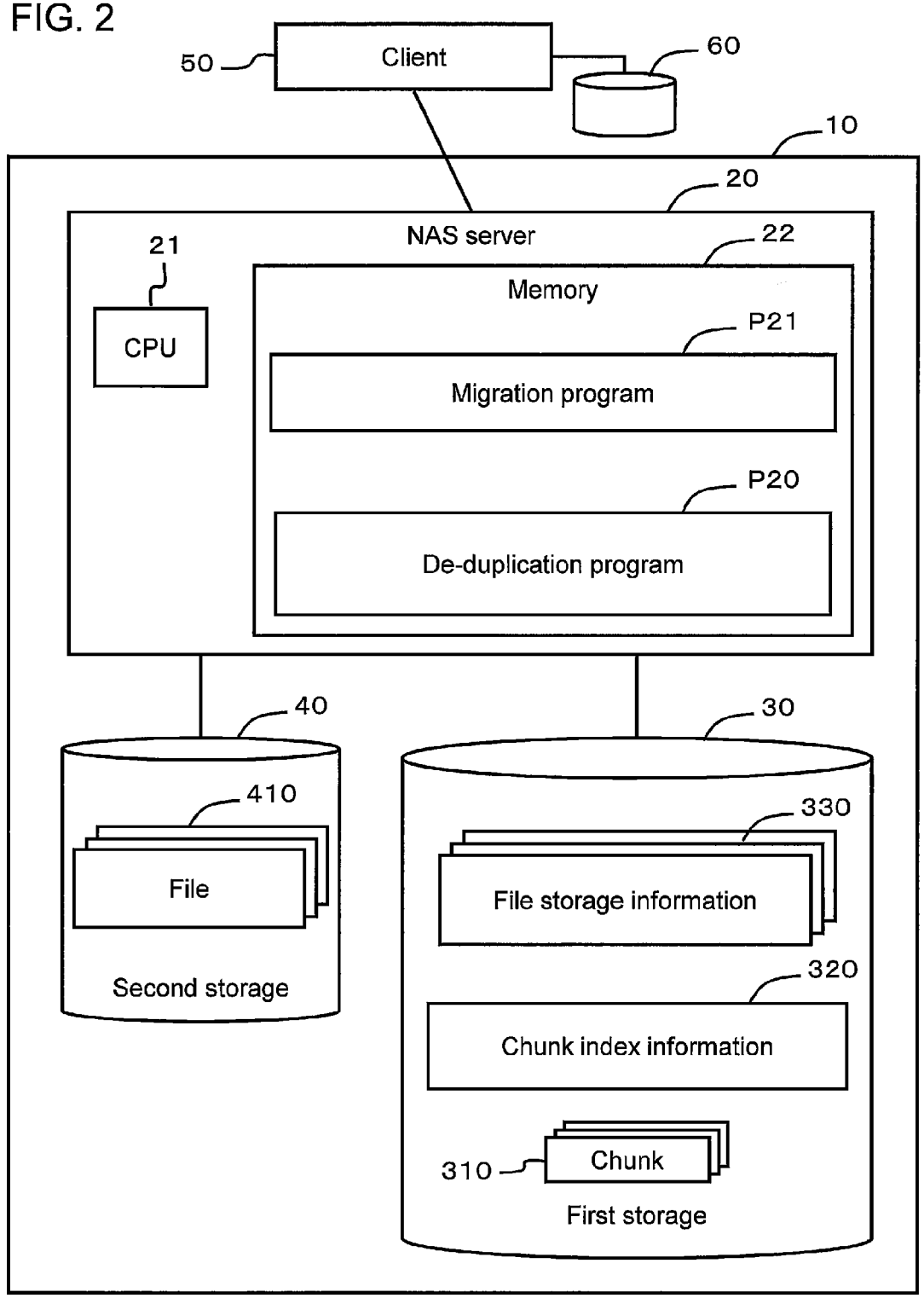
FIG. 2 is a block diagram of a data management system.

A first example will be explained by referring to FIGS. 2 through 9. FIG. 2 shows the overall configuration of a file data management system 10 as an example of a data management system. The file data management system 10, for example, can comprise a NAS (Network Attached Storage) server 20, a first storage apparatus 30, and a second storage apparatus 40.

The NAS server 20, for example, comprises a microprocessor 21, a memory 22, and a communication interface (not shown in the drawing). A de-duplication program P20, and a migration program P21 are stored in the memory 22.

The de-duplication program P20 is a computer program for detecting and eliminating duplicate file data and for partitioning and managing the file data as chunks of data. This program will be explained in detail further below.

The migration program P21 is a computer program transferring file data stored in the second storage apparatus 40 to the de-duplication program P21.

The first storage apparatus 30, for example, stores a chunk of data 310, chunk index information 320, and file storage information 330. The chunk index information 320 and the file storage information 330 will be described further below.

The second storage apparatus 40 stores management-target file data 410. Furthermore, the first storage apparatus 30 and the second storage apparatus 40 may be the same storage apparatus.

For example, various devices, such as a hard disk drive, an optical disk drive, a flash memory device, and so forth can be used as the storage apparatus. In addition, the configuration may also be such that another NAS is used as the storage apparatus.

A client computer 50 is coupled to the NAS server 20. The client computer 50 sends file data 410 stored in a storage apparatus 60 to the NAS server 20, and request that the NAS server 20 manage the file data 410. The NAS server 20 stores the file data 410 received from the client computer 50 in the second storage apparatus 40.

Figure 3:
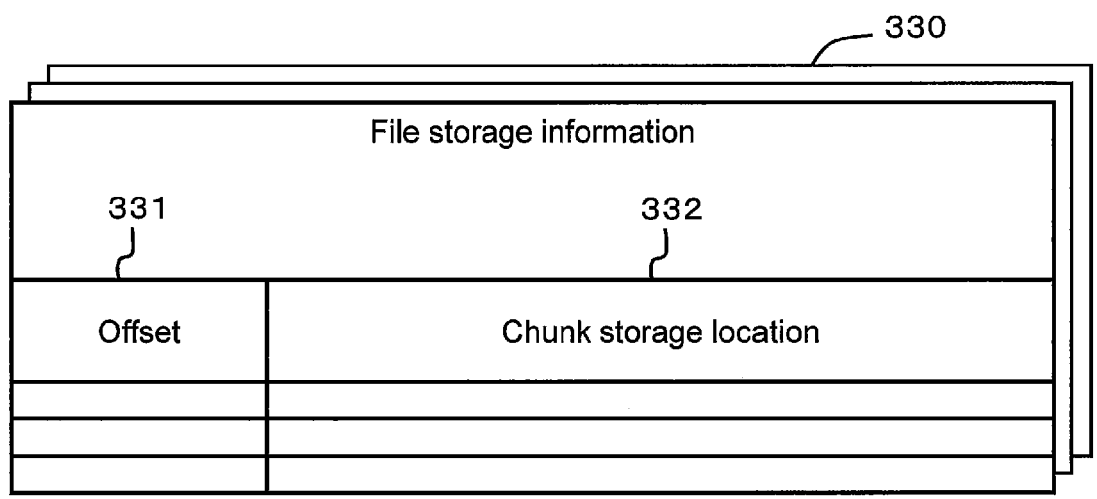
FIG. 3 is an example of the configuration of file storage information used for restoring a file from a chunk of data.

FIG. 3 shows an example of the file storage information 330. The file storage information 330 is prepared for each piece of file data 410. The file storage information 330 is management information for managing where inside the management system 10 the chunk of data corresponding to the respective portions of the file data 410 is stored.

The file storage information 330, for example, correspondingly manages an offset 331 and a chunk storage location 332 for each chunk of data. The offset 331 is information denoting the location (original location) of the chunk of data in the file data. The offset 331 denotes an offset value from the start address of the file data.

The chunk storage location 332 is information denoting the storage location of a chunk of data. The chunk storage location 332 may be a storage destination address or may be information such as a pointer that is associated with the storage destination address.

Figure 4:
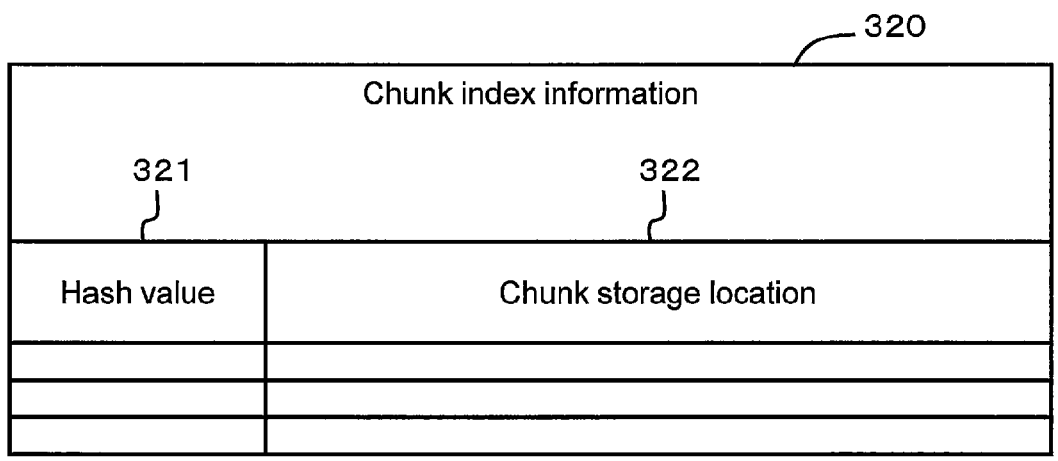
FIG. 4 is an example of the configuration of index information for managing the chunk of data.

FIG. 4 shows an example of the chunk index information 320. One piece of the chunk index information 320 is provided inside the file data management system 10. The chunk index information 320 correspondingly manages a hash value 321 and a chunk storage location 322.

The hash value 321 is a second hash value computed with respect to the chunk of data 310, and is used for determining the coincidence between chunks of data. The chunk storage location 322 is the same as the chunk storage information 332 described using FIG. 3.

Figure 5:
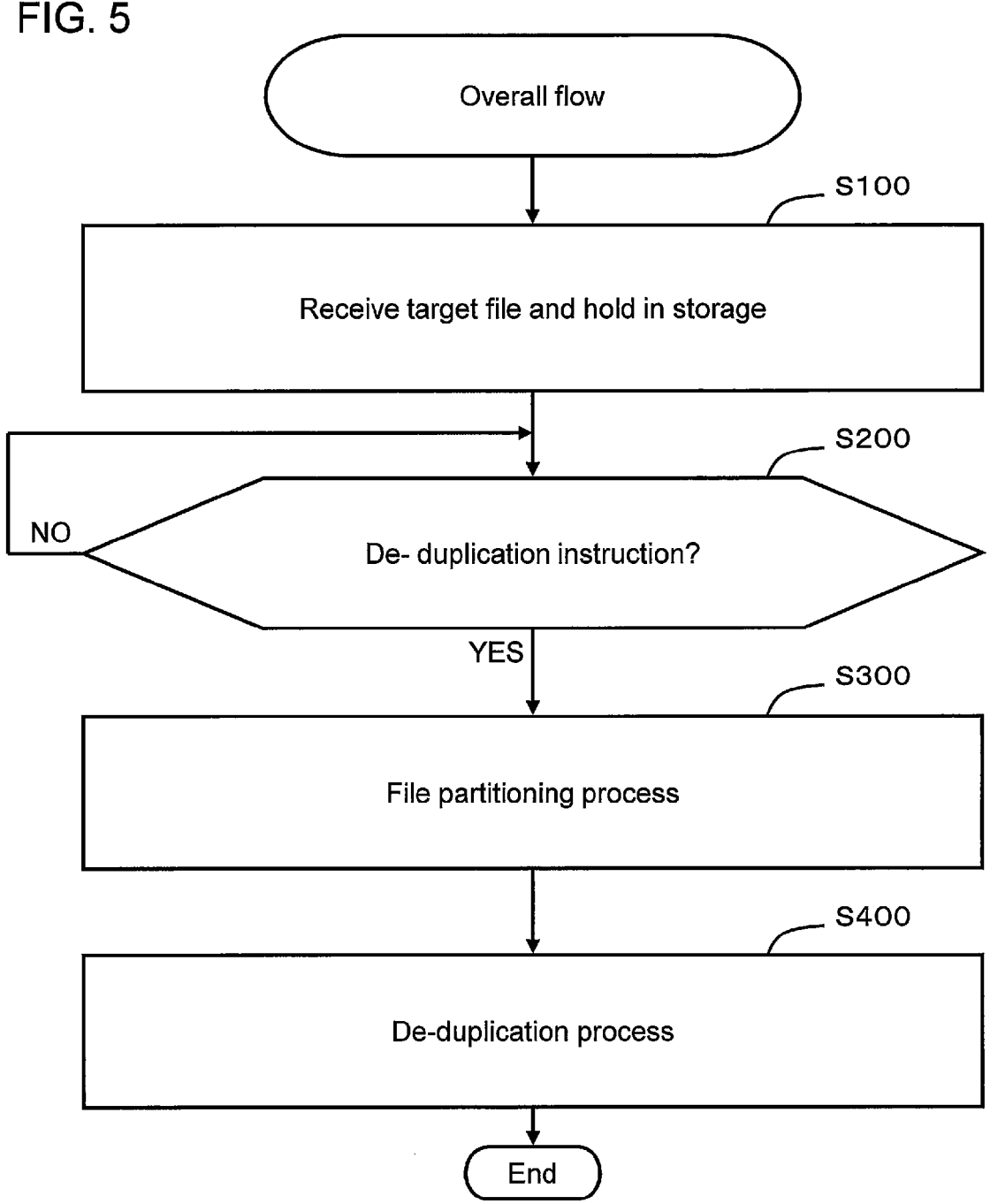
FIG. 5 is a flowchart showing the overall flow of processing.

FIG. 5 is a flowchart showing the overall operation of the file data management system 10. A step will be abbreviated as "S" below. Each of the following processes comprising this processing is realized by the microprocessor 21 executing the computer program P20 stored in the memory 22. Therefore, the subject of the sentence describing each of the processes below may be the program, or may be the micro-processor. Or, the subject of the sentence describing each of the processes below may be either the management system 10 or the NAS server 20.

The management system 10 receives file data 410 sent from the client computer 50 in the second storage apparatus 40 (S100).

The management system 10 determines whether or not the elimination of duplicate data was instructed (S200). There are multiple methods for eliminating duplication. For example, the client computer 50, after sending the file data 410 to the management system 10, can send the management system 10 a command instructing that duplication be eliminated. Or, the management system 10 can also receive a de-duplication instruction from another computer not shown in the drawing. In addition, the management system 10 can also select a time period when the load is light and instruct de-duplication itself.

When de-duplication has been instructed (S200: YES), the management system 10 uses the migration program P21 to transfer the file data 410 stored in the second storage apparatus 40 to the de-duplication program P20.

The de-duplication program P20 executes a file partitioning process (S300) with respect to the inputted file data 410, and thereafter, executes a de-duplication process (S400). The file partitioning process and the de-duplication process will be described further below using FIGS. 8 and 9.

Figure 6:
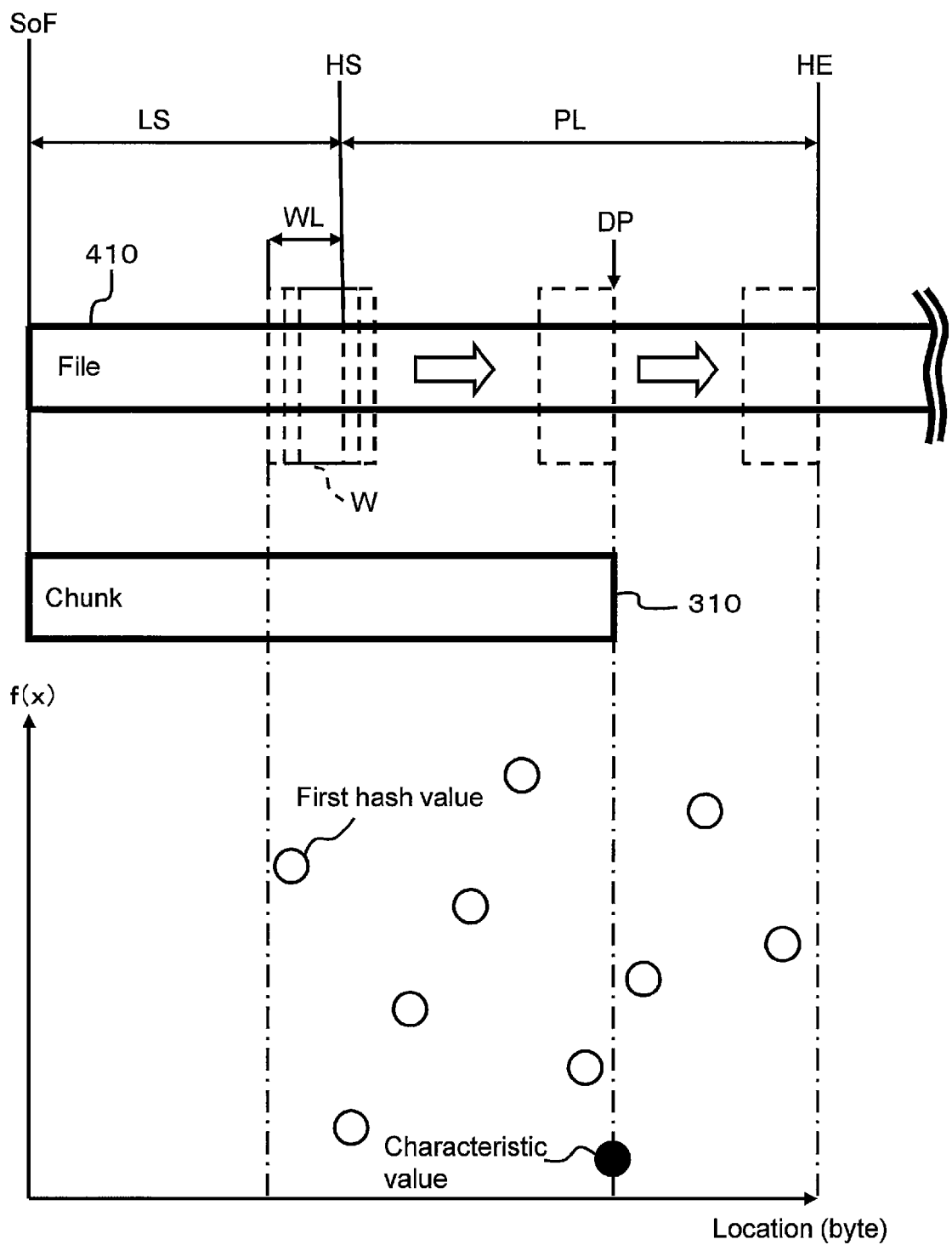
FIG. 6 is a diagram schematically showing how file data as a data block is partitioned based on hash values.
Figure 7:
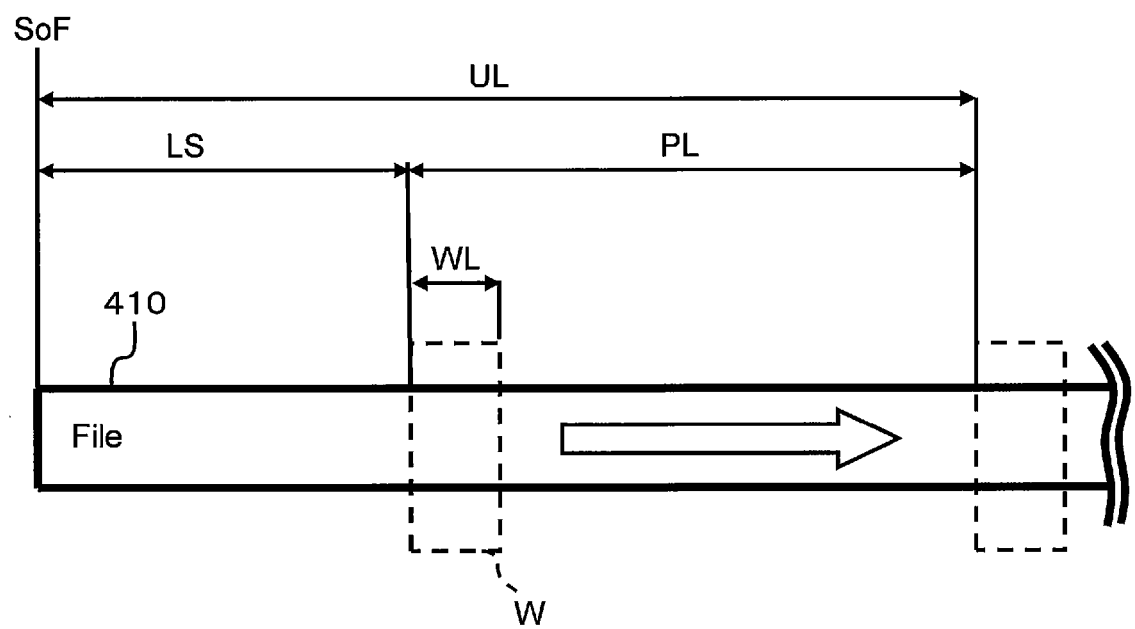
FIG. 7 is a schematic diagram showing another example of a window configuration location.

FIG. 6 schematically shows a method for partitioning the file data 410. As was described using FIG. 1, a window W is configured at a start location HS, which is posterior to the start of the file data 410 (SoF) by the lower limit LS.

As the window slides one byte at a time in a fixed direction (toward the end side of the file), the data within the window is inputted to the first hash function f(x) and a first hash value is computed. The management system 10 slides the window only a prescribed range (a prescribed size PL-worth of file data) from the start location HS to the end location HE.

In accordance with this, multiple first hash values are obtained, as indicated by the white circles toward the bottom of FIG. 6. The management system 10 selects, from among these first hash values, a location corresponding to the first hash value that is equivalent to the characteristic value (either one of the minimum value or the maximum value) as the partition location DP.

Furthermore, in FIG. 6, as a reference, the right edge of the window is made to coincide with the start location HS and the end location HE. Alternatively, the left edge of the window may be used as the reference as in FIG. 7.

Figure 8:
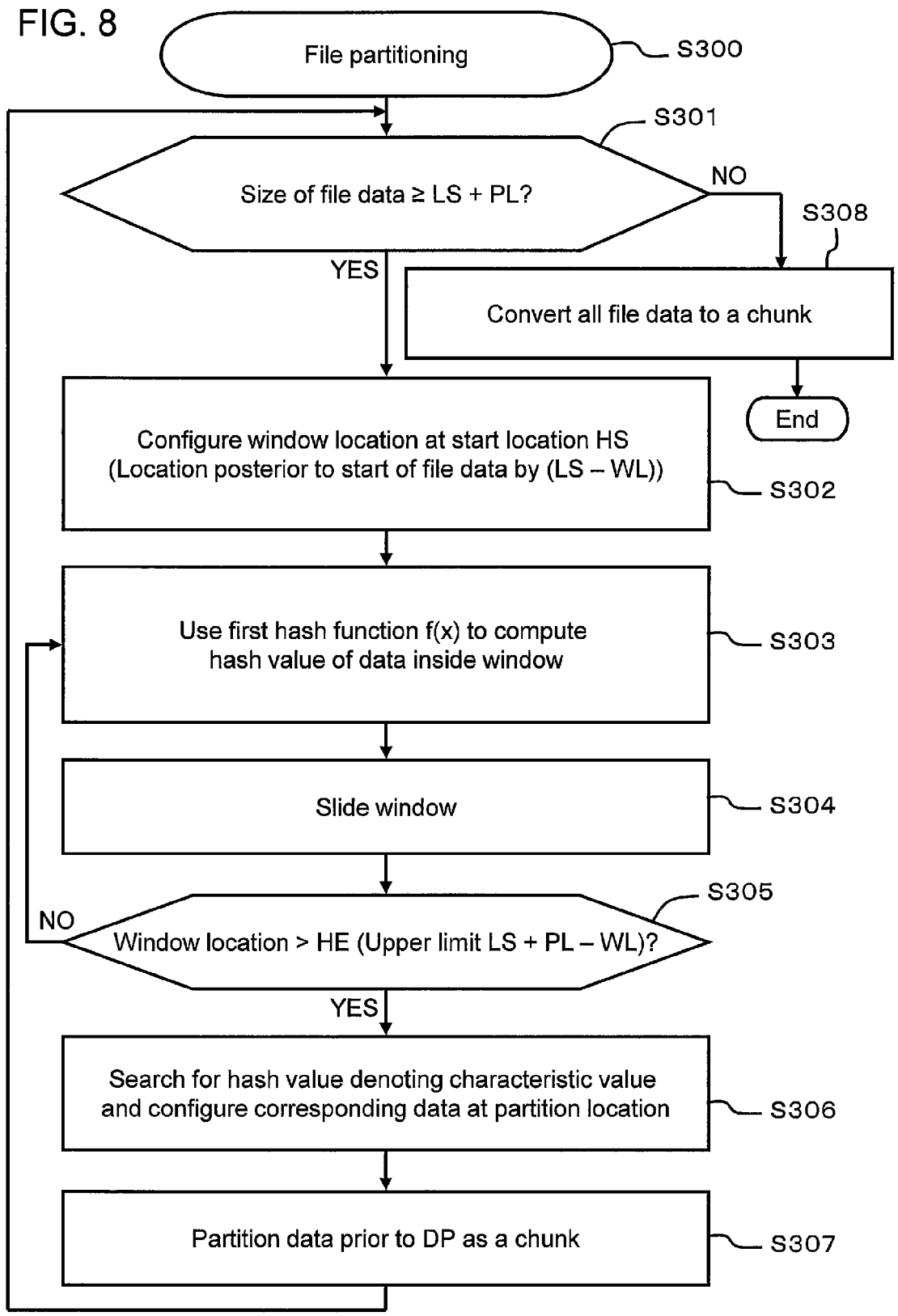
FIG. 8 is a flowchart showing the processing for partitioning a file.

The file partitioning process S300 will be explained in detail by referring to FIG. 8. To expedite the explanation, the de-duplication program P20 may be abbreviates as program P20 hereinbelow.

The program P20 determines whether or not the size of the file data to be targeted is equal to or larger than the total value of the lower limit LS and the prescribed size PL (S301).

The lower limit LS is a value for regulating the minimal size of a chunk of data. The prescribed size PL is a value for regulating the maximum sliding range of the window. Therefore, the total value of the lower limit LS and the prescribed size PL denotes the maximum size of the chunk of data.

In a case where the size of the file data is equal to or larger than the total value of the lower limit LS and the prescribed size PL (S301: YES), the target file data can be partitioned into multiple chunks of data. Therefore, the program P20 configures the location of the window at the start location HS (S302). In a case where the window reference is the right edge of the window, the start location HS is the location posterior to the start of the file data by (LS-WL) as shown in FIG. 6.

The program P20 computes a first hash value by inputting the data within the window into the first hash function f(x) (S303). The program P20 shifts the window one byte towards the right (S304). The program P20 determines whether or not the post-shift window location has reached the end location HE (S305). The end location HE is the location posterior to the start location HS by the prescribed size PL as shown in FIG. 6.

In a case where the window location has not reached the end location HE (S305: NO), the program P20 returns to S303, computes a first hash value from the data within the window, and shifts the window further to the right by one byte (S304). The program P20 repeatedly executes S302 through S304 like this until the window location reaches the end location HE.

In a case where the window location has reached the end location HE (S305: YES), the program P20 searches for the characteristic value-equivalent first hash value among the multiple first hash values acquired in S303. The program P20 configures the data location corresponding to the characteristic value-equivalent first hash value as the partition location DP (S306).

The program P20 partitions the file data at the partition location DP (S307). It is supposed that the data on the left side (the anterior data) of the file data that has been partitioned into two to the right and left of the partition location DP is a chunk of data.

The program P20, after clipping one chunk of data from the file data (S307), returns to S301. The program P20 partitions the file data into multiple chunks of data by repeatedly executing S301 through S307.

Then, in a case where the size of the file data is less than the total value of the lower limit LS and the prescribed size PL (S301: NO), the program P20 treats all of the remaining file data as a single chunk of data (S308). This makes it possible to prevent the wasteful computation of a first hash value.

Figure 9:
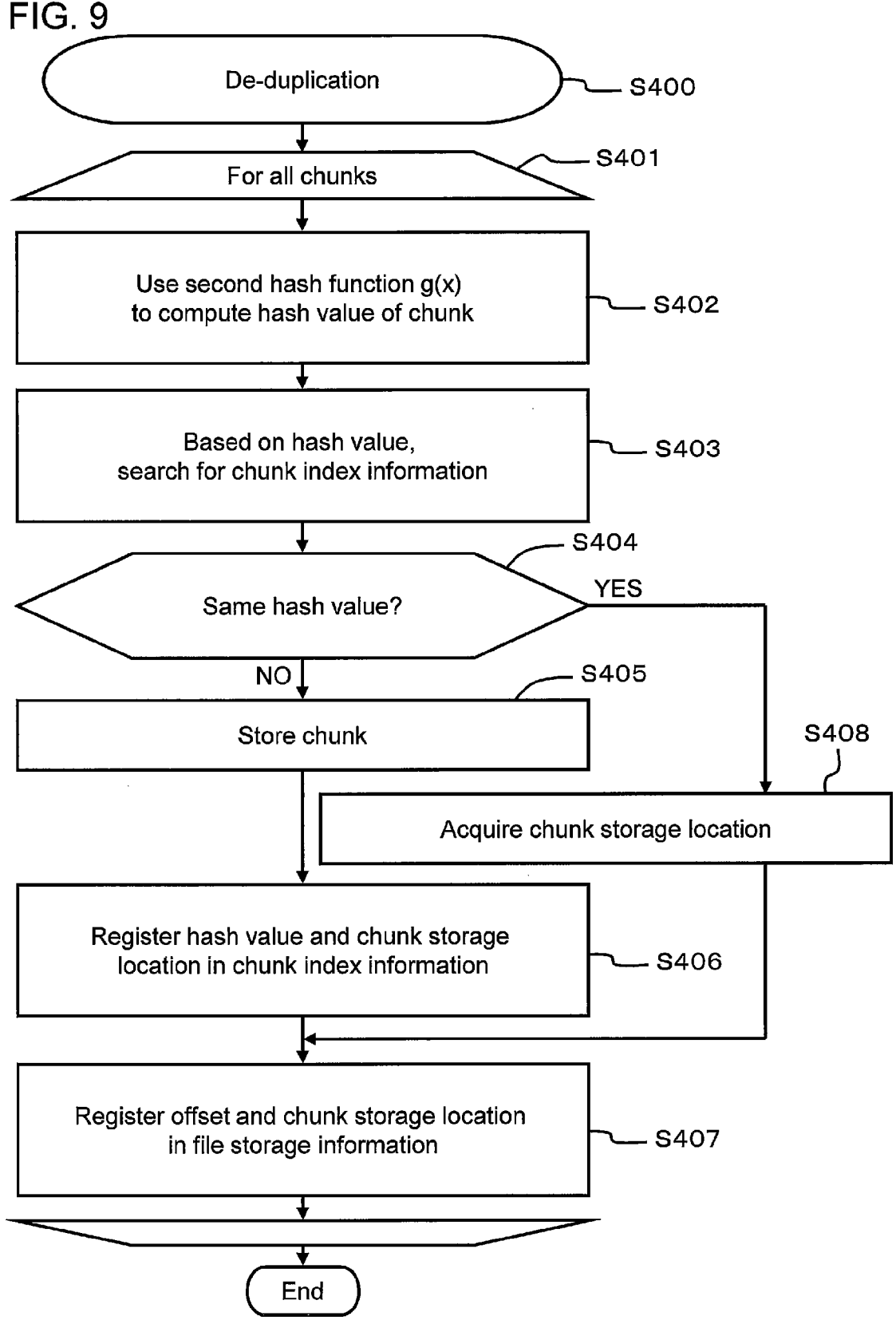
FIG. 9 is a flowchart showing the processing for detecting and eliminating duplicate data.

The de-duplication process S400 will be explained in detail by referring to FIG. 9. The de-duplication program P20 respectively executes S402 through S407 described below with respect to all of the multiple chunks of data (first chunk of data) partitioned from one piece of file data (S401).

The program P20 computes a second hash value by inputting a target chunk of data into the second hash function g(x) (S402). The second hash function g(x) may be the same as the first hash function f(x) or may be different.

The program P20 searches the chunk index information 320 using the second hash value as a search key (403). The program P20 determines whether a second hash value that is the same as the second hash value computed in S402 exists in the chunk index information 320 (S404).

In a case where a second hash value that is the same as the computed second hash value is not registered in the chunk index information 320 (S404: NO), the program P20 stores the chunk of data comprising the unregistered second hash value in the first storage apparatus 30 (S405).

The program P20 registers the chunk data storage location and the second hash value thereof in the chunk index information 320 (S406). The program P20 registers the offset, which denotes the location of the chunk of data in the file data, and the chunk data storage location in the file storage information 330 corresponding to the target file data (S407).

A case in which the second hash value computed with respect to the target has been registered in the chunk index information 320 of the chunk of data (S404: YES) will be explained. In this case, the program P20 acquires the chunk data storage location corresponding to this registered second hash value from the chunk index information 320 (S408).

The program P20 registers the offset, which denotes the location of the chunk of data in the file data, and the storage location of the chunk data storage, which has already been stored, in the file storage information 330 corresponding to the target file data (S407).

That is, the program P20 determines, based on the second hash value, whether or not the target chunk of data is already stored in the management system 10. In a case where this chunk of data has already been stored, the program P20 registers the stored chunk data storage location in the file storage information 330. The target chunk of data is not stored in the management system 10. This is because doing so would create a duplicate of the stored chunk of data.

In this example, which is configured like this, a first hash value is computed for the prescribed range from the start location HS (=the start of file location+LS) to the end location HE (=HS+PL). In addition, in this example, the file data is partitioned into chunks of data using a characteristic value, one or more of which are always included among multiple first hash values.

Therefore, in this example, the size of the chunk of data can be kept to a set range for the lower limit LS to an upper limit (=LS+PL). For this reason, it is possible to prevent the generation of a chunk of data, which is less than the lower limit LS and thus too short, and the generation of a chunk of data, which is too long and exceeds the upper limit. Therefore, this example makes it possible to increase duplicate data detection accuracy, to efficiently eliminate duplicate data, and to inhibit the same data from being stored twice.

The numeric values of the window size WL, the lower limit LS, and the prescribed size PL, for example, can be arbitrarily configured based on aspects such as the nature of the file data (structured data or unstructured data), and the free capacity of the storage. The file data management system 10 of this example can be incorporated and used in a variety of products.

SECOND EXAMPLE

A second example will be explained by referring to FIG. 10. Each of the following examples, to include this example, is a variation of the first example. Therefore, the differences with the first example will mainly be explained below.

Figure 10:
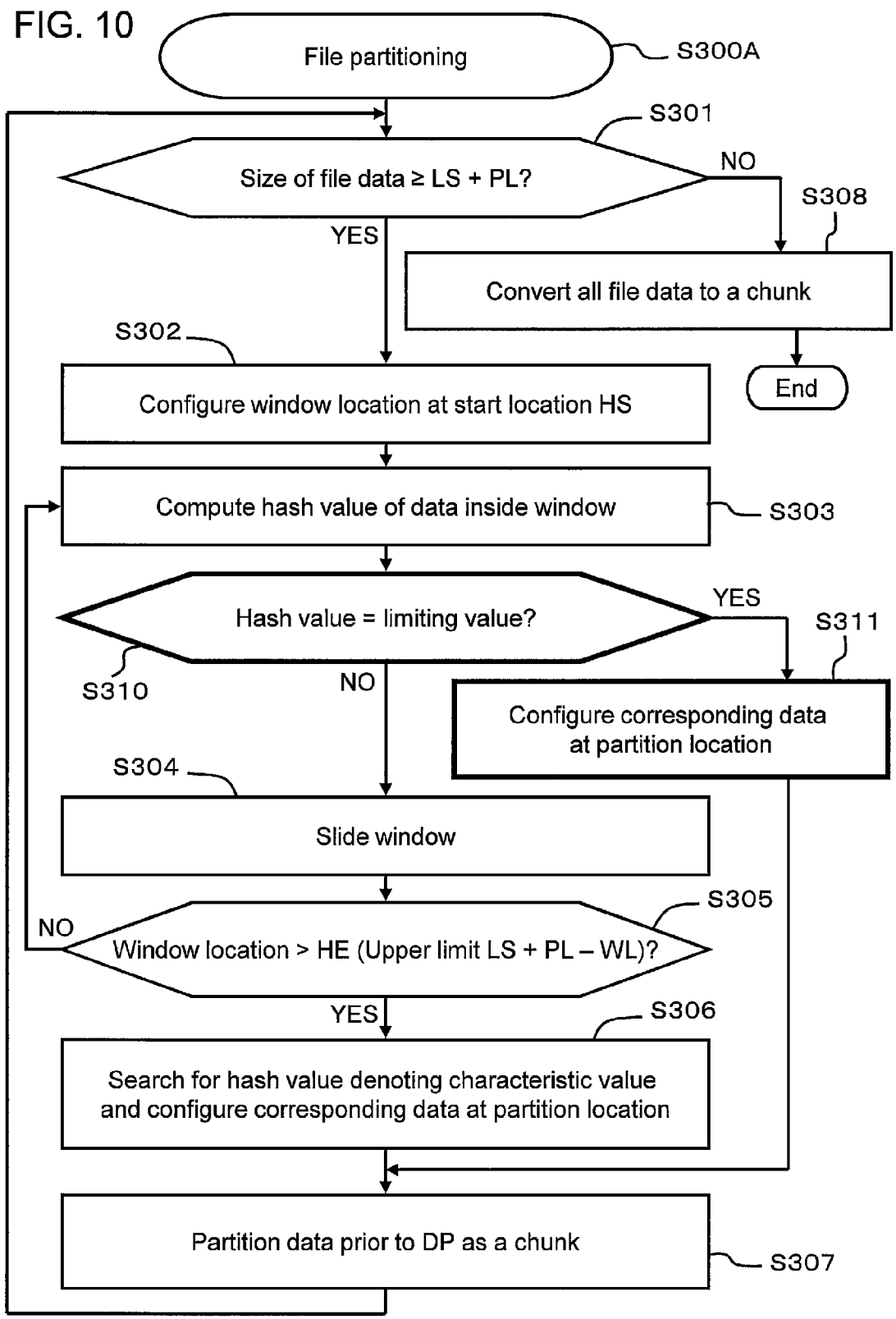
FIG. 10 is a flowchart related to a second example showing the processing for partitioning a file.

FIG. 10 is a flowchart showing a file partitioning process (S300A). This flowchart comprises all of S301 through S308 shown in FIG. 8. In addition, new processes (S310, S311) are added to this flowchart after the process (S303) for computing a first hash value from the data within the window.

The program P20, upon computing a first hash value (S303), determines whether or not this first hash value matches a preconfigured limiting value (S310).

The limiting value is a value denoting the theoretical limit of the characteristic value. In a case where the characteristic value is the minimum value of the hash values, this limiting value is "0000". In a case where the characteristic value is the maximum value of the hash values, this limiting value is the value stipulated by the hash function specification (for example, "FFFF").

Therefore, in a case where the minimum value is configured for the characteristic value, when the first hash value computed from the data within the window is "0", a determination that the characteristic value has been detected may be made at this time. This is because the first hash value matches the limiting value of the characteristic value, and this first hash value will always be equivalent to the characteristic value.

There is the likelihood that another first hash value, which is equivalent of the characteristic value, will appear thereafter. Therefore, the configuration is such that, in a case where multiple characteristic values are detected, the characteristic value that appears first is selected. The program P20 can terminate first hash value computation at the point in time when a first hash value that matches the limiting value of the characteristic value has been detected (S310: YES). The program P20 configures the location corresponding to the first hash value that matches the limiting value as the partition location (S311), and partitions the file data at the partition location (S307).

In a case where the computed first hash value does not match the limiting value (S310: NO), the program P20 shifts the window one byte to the right (S304), and computes a first hash value with respect to other data (S303).

Configuring this example like this achieves the same effect as the first example. In addition, in this example, in a case where the computed first hash value matches the limiting value, which is the theoretical limit of the characteristic value, this first hash value is selected as the characteristic value. The first hash value computation is cancelled even when the first hash value computation has not ended with respect to the entire prescribed range PL.

Therefore, in this example, the file data can be partitioned into the appropriate size faster than in the first example. For this reason, the processing for detecting and eliminating duplicate file data can be performed more rapidly, thereby enhancing usability.

THIRD EXAMPLE

A third example will be explained by referring to FIGS. 11 and 12. In this example, received target file data is processed serially.

Figure 11:
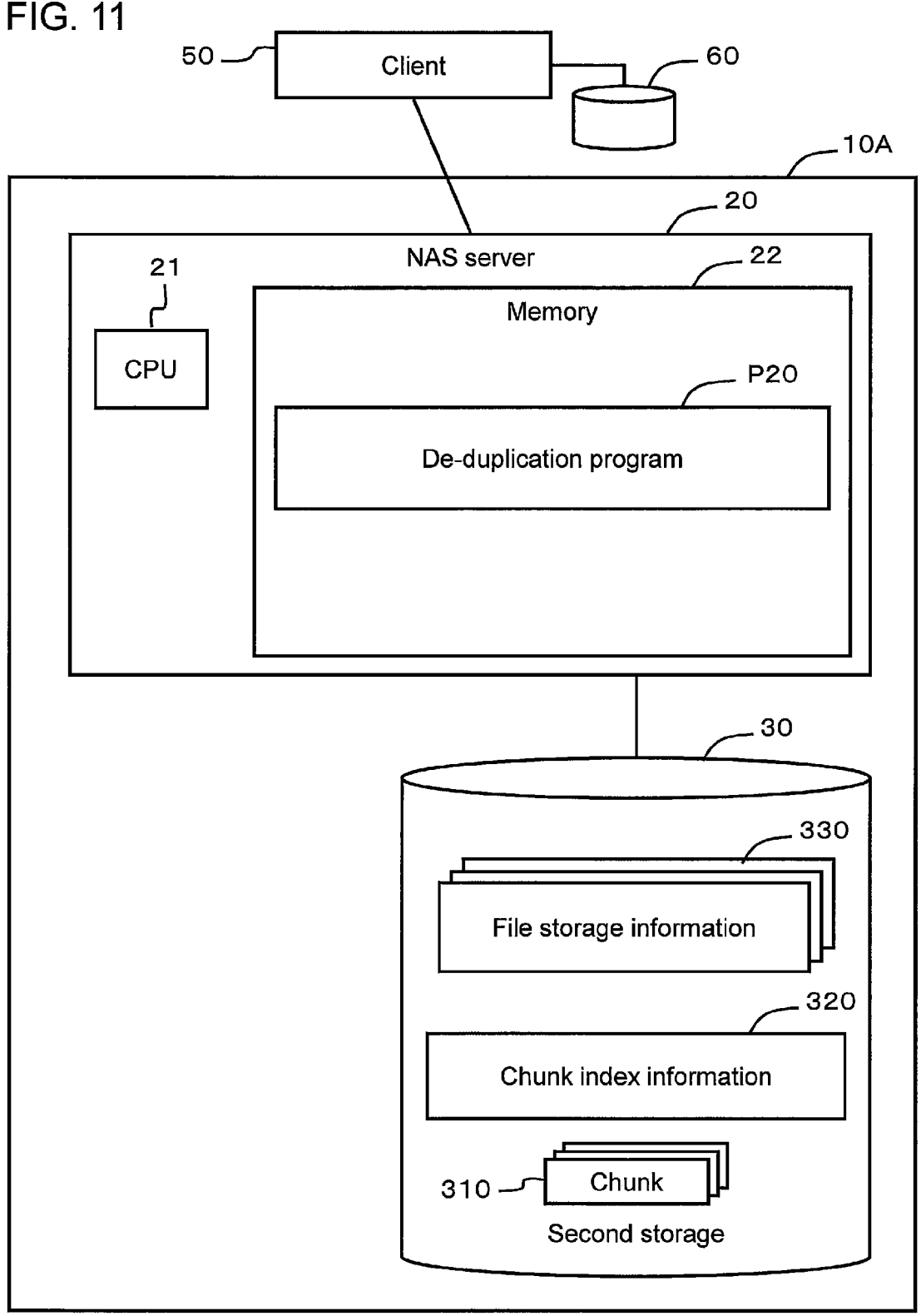
FIG. 11 is a block diagram showing an entire data management system related to a third example.

FIG. 11 shows the overall configuration of a file data management system 10A of this example. The first difference with the configuration shown in FIG. 2 is that the second storage apparatus 40 for storing the file data received from the client computer 50 does not exist. The second difference is that the migration program P21 does not exist.

FIG. 12 is a flowchart showing the overall operation of the third example. The management system 10A, upon receiving the target file data from the client computer 50 (S100A), immediately executes the file partitioning process (S300) and the de-duplication process (S400).

That is, in this example, the file data received from the client computer 50 is processed substantially at the same time that it is received. In this example, the file data may be temporarily stored in either a buffer memory or a cache memory inside the NAS server 20. However, this storage is not designed to wait for the start of the file partitioning process and the de-duplication process.

Configuring this example like this achieves the same effect as the first example. In addition, in this example, it is possible to partition and manage the file data in substantially real time.

The present invention is not limited to the embodiment described hereinabove. A person with ordinary skill in the art will be able to make various additions and changes without departing from the scope of the present invention. For example, the second example and the third example can be combined.

REFERENCE SIGNS LIST

10, 10A Data management system
P20 De-duplication program

The invention claimed is:

1. A data management method of a data system coupled to a client computer, and having a server configured in a system computer and a storage device configured to store a plurality of data blocks received from the client computer via the server, the server performing the method comprising:
    partitioning a first data block stored in the storage device into a first plurality of chunks of data, each of the first plurality of chunks not being fixed in size,
    computing a first hash value for each of the first plurality of chunks of the first data block,
    partitioning a second data block, which is updated data of the first data block received by the server from the client computer, into a second plurality of chunks of data, each of the second plurality of chunks not being fixed in size,
    computing a second hash value for each of the second plurality of chunks of the first data block,
    detecting a second chunk of the second plurality of chunks of the first data block as a duplicated portion of a first chunk of the first plurality of chunks of the first data block if the first hash value of the first chunk matches the second hash value, and
    storing a second data block without the second chunk in the storage device,
    wherein partitioning of the first data block into the first plurality of chunks comprises:
        (a1) computing a hash value for each piece of data within each of a first plurality of computation areas corresponding to the first data block, each of the computation areas not being fixed in size,
        (a2) determining, for each of a plurality of prescribed ranges of the first data block, a first particular hash value which is a maximum value or a minimum value among hash values within a prescribed range of the plurality of prescribed ranges, and
        (a3) partitioning the first data block into the first plurality of chunks at locations corresponding to the first particular hash value, and
    wherein partitioning of the second data block into the second plurality of chunks comprises:
        (b1) computing a hash value for each piece of data within each of a second plurality of computation areas corresponding to the second data block, each of the computation areas being fixed in size,
        (b2) determining, for each of a plurality of prescribed ranges of the second data block, a second particular hash value which is a maximum value or a minimum value among hash values within a prescribed range of the plurality of prescribed ranges of the second data block, and
        (b3) partitioning the second data block into the second plurality of chunks at locations corresponding to the second particular hash value.

2. The data management method according to claim 1, wherein, in a case where the first hash value obtained based on the data within a computation area of the first plurality of computation areas matches a value preconfigured as a theoretical limiting value of the first particular hash value, the first chunk is created by partitioning the first data block at a location corresponding to the first hash value that matches the theoretical limiting value.

3. The data management method according to claim 2, wherein a prescribed start location is configured as a value obtained by adding a prescribed lower limit to a start location of the first data block.

4. The data management method according to claim 3, wherein, in a case where a size of an entire data block does not satisfy a prescribed upper limit, the entire data block corresponds to the first chunk.

5. The data management method according to claim 4, further comprising:
  (c1) computing the second hash value for each of the first plurality of chunks based on each of the first plurality of chunks and a prescribed hash function: and
  (c2) comparing second hash values of the second plurality of chunks stored in a storage part to second hash values of the first plurality of chunks so as to determine whether or not a second hash value of the second chunk, which matches the second hash value of the first chunk, is stored in the storage part.

6. The data management method according to claim 5, further comprising:
  (d1) associating a new first chunk of data, which is among the first plurality of chunks and for which the second hash value computed with respect to the first chunk does not match any of the second hash values of the second plurality of chunks, with a destination of the new first chunk for storage and an original location in a data block of the new first chunk, and storing the new first chunk in the storage part as the second chunk;
  (d2) associating a stored first chunk of data, which is among the first plurality of chunks and for which the second hash value computed with respect to the first chunk matches any one of the second hash values of the second plurality of chunks, with a storage destination of the second chunk that matches the stored first chunk and an original location in the data block of the stored first chunk, and storing the stored first chunk in the storage part; and
  (d3) associating the storage destinations of the second plurality of chunks with the second hash values computed with respect to the second plurality of chunks, and storing the second plurality of chunks in the storage part.

7. The data management method according to claim 6, wherein the data block is partitioned into the first plurality of chunks based on a prescribed instruction subsequent to having been stored once in a data block storage part configured to store data blocks.

8. The data management method according to claim 6, wherein the data block is partitioned into the first plurality of chunks while the data block is being received.

9. A data management system for partitioning and managing data blocks, the data management system comprising:
a data system,
a client computer coupled to the data system,
a server configured in a system computer, and
a storage device configured to store a plurality of data blocks received from the client computer via the server, the storage device comprising a memory, the server configured to:
partition a first data block stored in the storage device into a first plurality of chunks of data, each of the first plurality of chunks not being fixed in size,
compute a first hash value for each of the first plurality of chunks of the first data block,
partition a second data block, which is updated data of the first data block received by the server from the client computer, into a second plurality of chunks of data, each of the second plurality of chunks not being fixed in size,
compute a second hash value for each of the second plurality of chunks of the first data block,
detect a second chunk of the second plurality of chunks of the first data block as a duplicated portion of a first chunk of the first plurality of chunks of the first data block if the first hash value of the first chunk matches the second hash value, and
store a second data block without the second chunk in the storage device,
wherein partitioning of the first data block into the first plurality of chunks comprises:
  (a1) computing a hash value for each piece of data within each of a first plurality of computation areas corresponding to the first data block, each of the computation areas not being fixed in size,
  (a2) determining for each of a plurality of prescribed ranges of the first data block, a first particular hash value which is a maximum value or a minimum value among hash values within a prescribed range of the plurality of prescribed ranges, and
  (a3) partitioning the first data block into the first plurality of chunks at locations corresponding to the first particular hash value,
wherein partitioning of the second data block into the second plurality of chunks comprises:
  (b1) computing a hash value for each piece of data within each of a second plurality of computation areas corresponding to the second data block, each of the computation areas being fixed in size,
  (b2) determining, for each of a plurality of prescribed ranges of the second data block, a second particular hash value which is a maximum value or a minimum value among hash values within a prescribed range of the plurality of prescribed ranges of the second data block, and
  (b3) partitioning the second data block into the second plurality of chunks at locations corresponding to the second particular hash value.

* * * * *